Aug. 16, 1949.  P. F. TUERK  2,479,280
TRUCK COVER CANVAS CONNECTION
Filed May 3, 1948
Fig. 1.
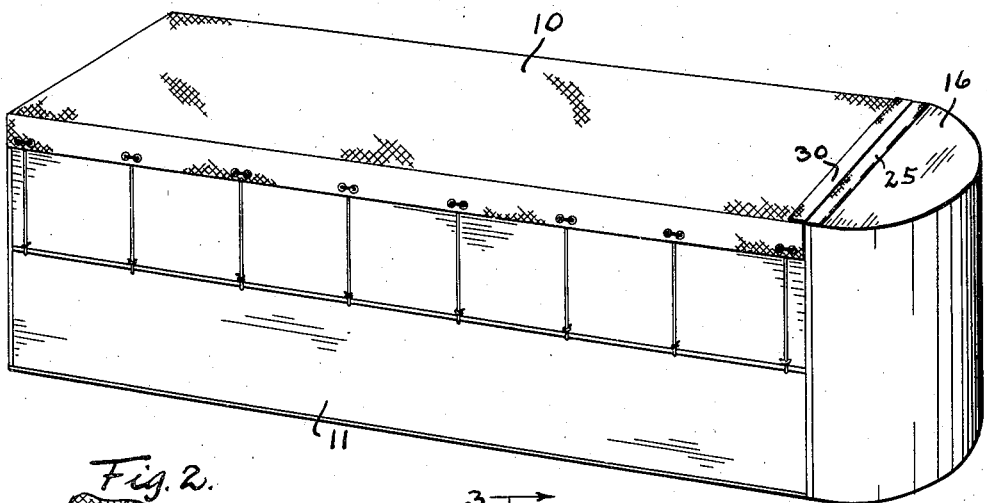
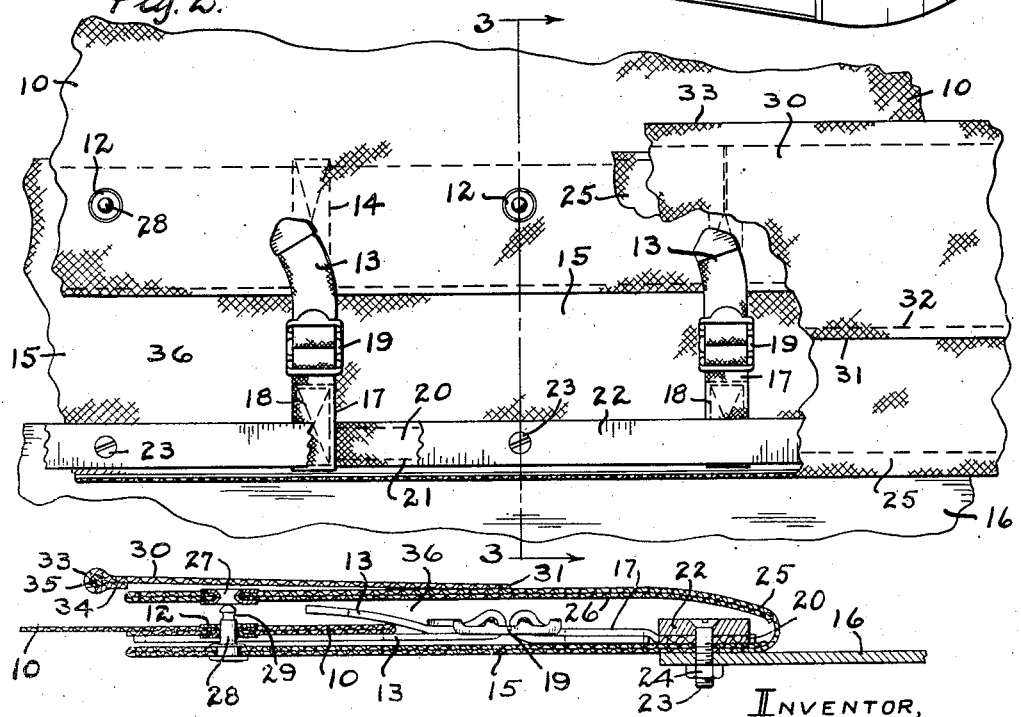
Fig. 2.
Fig. 3.
INVENTOR,
PAUL F. TUERK,
By Herbert A. Minturn
ATTORNEY.

Patented Aug. 16, 1949

2,479,280

UNITED STATES PATENT OFFICE 2,479,280

TRUCK COVER CANVAS CONNECTION

Paul F. Tuerk, Indianapolis, Ind.

Application May 3, 1948, Serial No. 24,699

3 Claims. (Cl. 296—100)

This invention relates to means for securing an end of a canvas, particularly the forward end, which is generally employed to cover over a truck or a truck trailer, and which structure may be employed to permit quick attaching and detaching of the canvas from the truck member, and at the same time afford perfect security against water leakage across or around the connection.

A primary object of the invention is to provide a structure which may be applied to truck bodies or truck trailers already constructed so that there will be no material change in construction of any part of the truck member. A further primary object of the invention is to provide a structure which will withstand the intense pressure applied to the canvas under traffic conditions due to wind pressures and the like, and which construction will withstand not only these pressures, but also prevent the driving in and around the connection of rain.

A still further important object of the invention is to provide an interconnection of the nature above indicated wherein the connection may be quickly made all without use of tools, and without having to exert undue energy in pulling the canvas into position.

These and many other objects and advantages of the invention will become apparent to those versed in the art in the following description of one particular form of the invention as illustrated in the accompanying drawing, in which, Fig. 1 is a view in top perspective of a trailer body to which the invention is applied;

Fig. 2, a view in top plan in partial section of a fragmentary portion of the structure embodying the invention; and Fig. 3, a longitudinal section on the line 3—3 in Fig. 2.

Referring to the drawing, in which like characters of reference indicate like parts in the several views, there is employed the usual canvas 10 which has sufficient length and breadth to cover over the top side at least of the body 11. This canvas 10 is preferably hemmed along its forward edge to provide a double thickness, through which are secured a plurality of spaced apart grommets 12. Then in intermediate spacing between adjacent grommets 12, there is secured to this forward end edge portion of the canvas 10 a plurality of straps 13 to be fixed thereto in any suitable manner such as by the stitching 14. The straps 13 extend by lengths forwardly from the edge of the canvas 10.

A band of canvas 15 is formed, preferably of double thickness, Fig. 3, to be clamped through a forward portion to a metal deck 16 which extends rearwardly from the forward end of the body 11. Spaced along this strip 15 are a plurality of straps 17 secured thereto by any suitable means such as by the stitching 18. The rear ends of these straps 17 carry buckles 19, and the straps 17 are aligned in spaced relation one from the other with the corresponding spacing of the straps 13 which are secured to the canvas 10. That is, the spacing between the straps 13 on the canvas 10 equals the spacing between the straps 17 on the canvas strip 15.

Extending between adjacent strap 17 is a length of strap 20 to be of the same thickness as that of each of the straps 17. These straps 20 are secured to the strip 15 by any suitable means, herein shown as by the stitching 21. These intermediate straps 20 serve as fillers between the straps 17.

Over the straps 20 and across the forward ends of the straps 17 there is positioned a metal bar 22, and bolts 23 are passed through the bar 22, the straps 20, the strip 15, and the deck 16, to be held in position and drawn down against the deck 16 by means of a nut 24 in each instance.

From the forward end portion of the strip 15, there is a length of the canvas extended integrally from the strip 15, this length being designated by the numeral 25. It is folded around, preferably by a single thickness to extend back over the top of the strip 15, and substantially to the rear terminal edge portion of that strip 15, Fig. 3. The overlying portion of this length 25 is preferably doubled by having a length thereof, 26, carried back thereunder to the bend immediately forward of the bar 22. Spaced along the rear end portion of this turned back strip 25 is a plurality of grommets 27, each grommet being spaced to center upon the grommet 12 thereunder. The strip 15 has affixed thereto a post 28 to center with the grommets 12 carried by the canvas 10 so that the canvas 10 may be pulled up over the strip 15 to have the grommets 12 slipped over and pushed down on these posts 28. Then the straps 13 may be entered through the buckles 19 to pull the canvas 10 forwardly so that the strain of rearward pull by the canvas 10 is taken primarily through the straps 13, 17, and the interconnecting buckles 19. Then the top flap 25, 26, is pushed down over the interconnected straps and the forward end portion of the canvas 10 to have the grommets 27 pushed down into connecting engagement with the top ends of post 28. These grommets 27 and the post 28 are made in the usual manner of glove fasteners whereby the post 28 has a groove 29 therearound into which the grommet 27 may yieldingly engage.

To complete the assembly, there is a flap 30 secured by its forward end 31 such as by stitching 32 to the rearwardly extending portions 25 and 26. This flap 30 extends rearwardly to cover over completely the portions 25 and 26 from the stitched line 32 and to extend preferably by an overhanging end portion 33 therebeyond. In order to maintain the flap 30 in its lowermost position to cover over particularly the grommets 27, this end portion is provided with a hem 34 in which is sewed a rope 35 to give the desired rigidity.

Thus it is to be seen that the forward end of the canvas 10 is carried within the pocket 36 formed between the strip 15 and the overlying extension thereof designated by the numerals 25, 26 to have the strain straps 13, 17, take the tension of pull of the canvas 10 from the deck 16, and at the same time there is provided the securing means of holding the members 25, 26, downwardly against flapping by means of the interengagement of the grommets 27 with the post 28, and then the further covering protection of the flap 30 to complete the water repelling provisions of the entire assembly. It is to be seen that such a means for anchoring the forward end of the canvas 10 may be operated very easily and at the same time will be quite endurable as well as being water and wind proof.

While I have herein shown and described my invention in the one particular form, it is obvious that structural changes may be employed, all without departing from the spirit of the invention, and it is to be particularly pointed out that the invention is not primarily limited to truck bodies or truck trailers, and I therefore do not desire to be limited to that precise form beyond the limitations which may be imposed by the following claims.

I claim:

1. A structure for securing a cover canvas to a body, comprising in combination, a flexible band; means securing the band to the body; straps extending from said canvas; straps extending over said band from said securing means; means for interengagement of the straps over said band; a length of canvas extending from said securing means in overlapping arrangement across said straps and an end portion of said cover canvas; a plurality of posts carried by said band; grommets carried by said cover canvas, through which said posts may extend; grommets in said overlapping canvas spaced for engagement with said posts; and a flap fixed to said overlapping canvas to extend over the grommets therein.

2. A structure for securing a cover canvas to a body, comprising in combination, a flexible band; means securing the band to the body; straps extending from said canvas; straps extending over said band from said securing means; means for interengagement of the straps over said band; a length of canvas extending from said securing means in overlapping arrangement across said straps and an end portion of said cover canvas; a plurality of posts carried by said band; grommets carried by said cover canvas, through which said posts may extend; grommets in said overlapping canvas spaced for engagement with said posts; and a flap fixed to said overlapping canvas to extend over the grommets therein; said securing means comprising a clamp bar compressively urging said band against said body, said overlapping canvas length being retained also by said bar and being folded thereover.

3. In combination with a body member, a flexible band of material; a plurality of straps secured to said band; means for fixing said band along a longitudinal portion thereof to said member, and also fixing said straps thereto; a cover canvas having an edge portion to overlap said band; a plurality of straps extending from said edge thereof having a common spacing with said first straps; buckles for interengaging said canvas straps with said first straps; a cover flap fixed in relation to said body member and folded over said fixing means to overlap said straps and a marginal edge of said canvas; and means for detachably securing said flap in said overlapping position; spaced apart posts fixed to said band to extend upwardly therefrom; and locating grommets in said canvas edge portion spaced to be engaged by said posts; and grommets in said flap located to engage said posts constituting said flap detachable securing means; said flap being a continuous part of said band; said means for fixing the band to said body member comprising a bar and means for pulling the bar toward said member to compress said band and straps theretoward; and a second flap secured to said first flap to overlie said flap grommets and extend beyond the first flap and over said cover canvas; and a corded hem along the edge portion of said second flap which projects beyond said first flap.

PAUL F. TUERK.

REFERENCES CITED

The following references are of record in the file of this patent:

UNITED STATES PATENTS

| Number | Name | Date |
| --- | --- | --- |
| 988,204 | Mitchell | Mar. 28, 1911 |
| 1,584,518 | Drake | May 11, 1926 |